United States Patent
Bosek

(10) Patent No.: US 12,471,560 B2
(45) Date of Patent: Nov. 18, 2025

(54) MILKING SYSTEM AND A METHOD OF CONTROLLING A MILKING SYSTEM

(71) Applicant: DELAVAL HOLDING AB, Tumba (SE)

(72) Inventor: Lukasz Bosek, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/780,913

(22) PCT Filed: Nov. 26, 2020

(86) PCT No.: PCT/SE2020/051135
§ 371 (c)(1),
(2) Date: May 27, 2022

(87) PCT Pub. No.: WO2021/107852
PCT Pub. Date: Jun. 3, 2021

(65) Prior Publication Data
US 2022/0408681 A1  Dec. 29, 2022

(30) Foreign Application Priority Data
Nov. 28, 2019 (SE) .................................. 1951362-1

(51) Int. Cl.
*A01J 9/04* (2006.01)
*A01J 7/00* (2006.01)

(52) U.S. Cl.
CPC ..................... *A01J 9/04* (2013.01); *A01J 7/005* (2013.01)

(58) Field of Classification Search
CPC .................... A01J 9/04; A01J 7/005
See application file for complete search history.

(56) References Cited

U.S. PATENT DOCUMENTS

| 4,710,755 A | 12/1987 | Gurney |
| 5,275,124 A | 1/1994 | Van Der Lely et al. |

(Continued)

FOREIGN PATENT DOCUMENTS

| EP | 1 139 723 | 10/2001 | |
| EP | 1 260 777 | 11/2002 | |
| EP | 1 388 281 | 2/2004 | |
| WO | 00/35271 | 6/2000 | |
| WO | 2007/045489 | 4/2007 | |
| WO | WO-2018111184 A1 * | 6/2018 | ............... A01J 11/00 |

OTHER PUBLICATIONS

English Machine Translation of WO 2007/045489 A1 provided, accessed on Jul. 17, 2023, original publication dated Apr. 26, 2007 (Year: 2007).*

(Continued)

*Primary Examiner* — Joshua D Huson
*Assistant Examiner* — Edgar Reyes
(74) *Attorney, Agent, or Firm* — NIXON & VANDERHYE

(57) ABSTRACT

A milking system configured to milk animals includes a milking station, a first milk tank, and a second milk tank, a controllable valve arrangement configured to open or close a first branch and to open or close a second branch of a milk transport conduit, to control to which tank that milk is transported, and a control device configured to control the controllable valve arrangement. The milking system includes a sensor configured to sense a property of milk present in the first milk tank or of milk flowing towards the first milk tank, or a sensor configured to sense a property of a cooling arrangement for controlling the temperature of the milk in the first milk tank. The control device is configured to control the controllable valve arrangement based on information from the sensor.

20 Claims, 1 Drawing Sheet

(56) References Cited

U.S. PATENT DOCUMENTS

| | | | | |
|---|---|---|---|---|
| 6,006,615 | A * | 12/1999 | Uttinger | A01J 5/007 |
| | | | | 73/866 |
| 7,036,981 | B2 * | 5/2006 | Veenstra | A01J 7/027 |
| | | | | 374/142 |
| 7,834,774 | B2 * | 11/2010 | Stevens | A01J 5/007 |
| | | | | 134/115 R |
| 2007/0017448 | A1 | 1/2007 | Stevens et al. | |
| 2007/0056302 | A1 * | 3/2007 | Otake | F25B 47/00 |
| | | | | 62/243 |
| 2011/0247563 | A1 | 10/2011 | Schrader et al. | |
| 2012/0006270 | A1 | 1/2012 | Bosma | |
| 2015/0196003 | A1 | 7/2015 | Brayer | |
| 2018/0153130 | A1 | 6/2018 | Sjolund | |

OTHER PUBLICATIONS

EP 3572778 A1 (Year: 2019).*
International Search Report for PCT/SE2020/051135 dated Feb. 25, 2021, 4 pages.
Written Opinion of the ISA for PCT/SE2020/051135 dated Feb. 25, 2021, 8 pages.
Swedish Search Report for SE1951362-1 mailed Nov. 28, 2019, 3 pages.

* cited by examiner

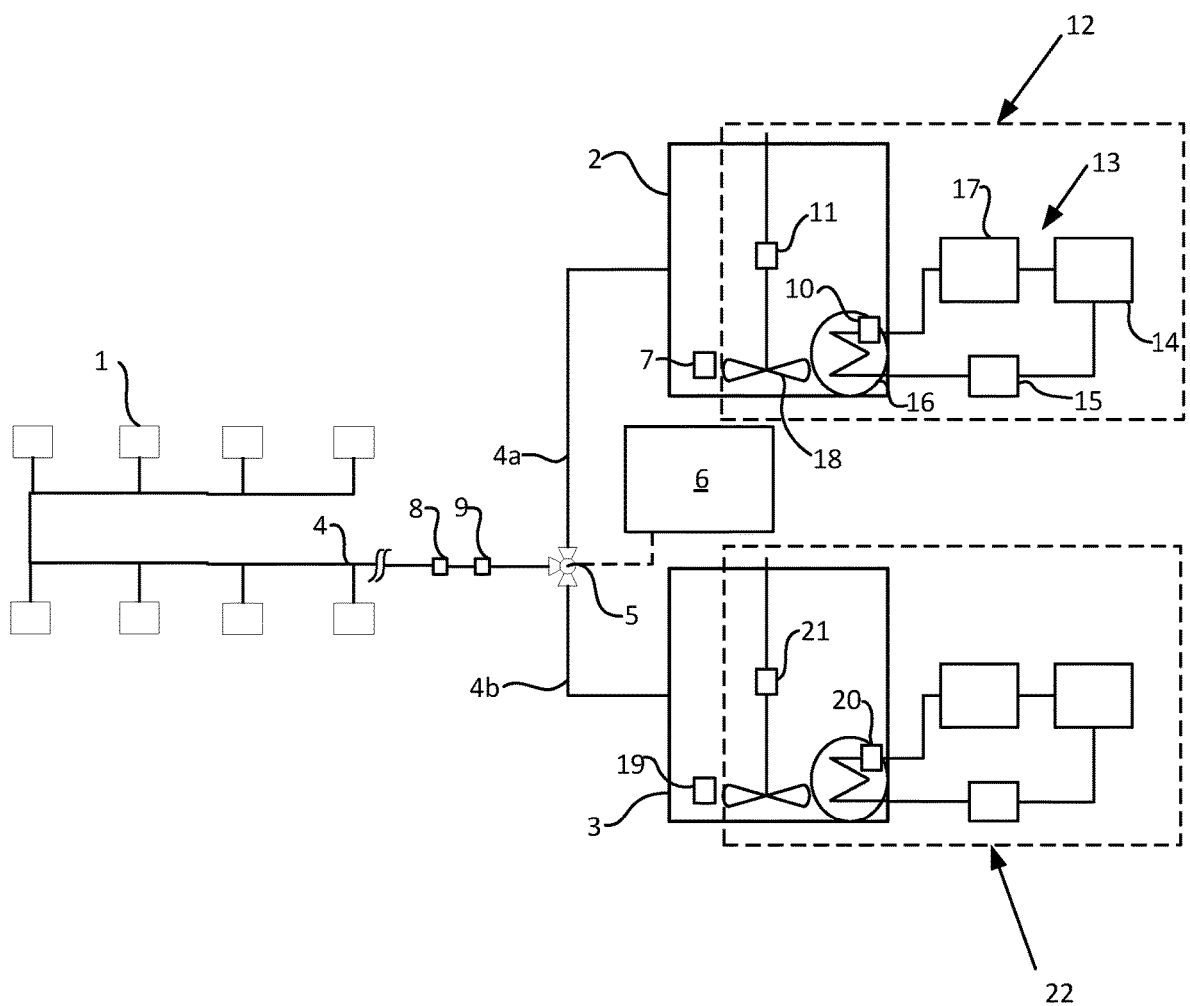

MILKING SYSTEM AND A METHOD OF CONTROLLING A MILKING SYSTEM

This application is the U.S. national phase of International Application No. PCT/SE2020/051135 filed Nov. 26, 2020 which designated the U.S. and claims priority to SE 1951362-1 filed Nov. 28, 2019, the entire contents of each of which are hereby incorporated by reference.

TECHNICAL FIELD

The present invention relates to a milking system configured to milk animals, said system comprising: at least one milking station, a first milk tank and a second milk tank, a milk transport conduit extending from the milking station towards the first and second milk tank and having a first branch extending to the first tank and a second branch extending to the second tank, a controllable valve arrangement configured to open or close the first branch and to open or close the second branch, to control to which of the first milk tank and the second milk tank that milk is transported through one of said first and second branch, and a control device configured to control the controllable valve arrangement.

The present invention also relates to a method of controlling such a milking system.

BACKGROUND

Milking systems configured for the milking of animals on an industrial basis may be provided with more than one tank for the purpose of shifting between tanks when one is full, as described in US 2018/0153130.

During operation of the milking system, milk from the milking stations is transported into one of the tanks and the level of milk in the tank is measured by means of any suitable means, such as a float, which is connected to a control device. Alternative examples of means for directly or indirectly measuring the milk level in the tank may include pressure transducers, flow meters in the milk line, ultrasonic sensors, laser sensors and load cells. The control device may, in its turn, be connected to a controllable valve arrangement by means of which it is possible to control to which tank to deliver the milk from the milking stations. When the milk level in the first tank has reached a threshold value, normally indicating that the tank is full or nearly full, the flow of milk is thus redirected to a second tank. The first tank is emptied and the milk flow is subsequently redirected to the first milk tank. The second tank may also be provided with a float or the like, and redirection of the milk flow to the first tank may also be dependent on the milk level in the second tank.

Milk quality control is an important factor in milk production, and includes control of the temperature of the milk, as well as control of milk properties such as electric conductivity and turbidity, which may be used as indicators of the condition of the milk. The milk may have a temperature of approximately 37° C. when leaving the milking stations and should have a temperature of approximately 4° C. in the tank. Cooling control is extremely important from a bacteriological point of view, and it is important that there are not hot spots or cold spots in the mass of milk gathered in the tank. Therefore, tanks are provided with a cooling arrangement comprising a cooling system via which the heat is transferred from the milk to the cooling system, and a stirrer arranged in the tank for the purpose of stirring the milk and avoiding hot spots and cool spots of the milk in the tank and promoting an even milk temperature in the tank. If milk of unacceptable quality reaches the tank and/or the temperature of the milk in a tank is too high, the milk in that tank may have to be discarded, resulting in unwanted lower milk yield.

It is an object of the present invention to present a milking system and a method of controlling such a system that reduces the amount of discarded milk and that thus results in a higher milk production yield.

SUMMARY

The object of the invention is achieved by means of a milking system configured to milk animals, said system comprising:
  at least one milking station,
  a first milk tank and a second milk tank,
  a milk transport conduit extending from the milking station towards the first and second milk tank and having a first branch extending to the first tank and a second branch extending to the second tank,
  a controllable valve arrangement configured to open or close the first branch and to open or close the second branch, to control to which of the first milk tank and the second milk tank that milk is transported through one of said first and second branch,
  a control device configured to control the controllable valve arrangement, said milking system being characterized in that it comprises at least one sensor configured to sense a milk property of milk present in the first milk tank or flowing towards the first milk tank through said milk transport conduit, or configured to sense a property of a cooling arrangement for controlling the temperature of the milk in the first milk tank, and that the control device is connected to said at least one sensor and configured to control the controllable valve arrangement on basis of information from said sensor.

According to one embodiment, the control device is configured to close the first branch and open the second branch as a response to information from said sensor indicating a deviation of the sensed property from a predetermined range.

According to one embodiment, said sensor comprises a sensor that senses a property that is indicative of the temperature of the milk in the first milk tank.

According to one embodiment, said sensor comprises a sensor configured to sense the electric conductivity of the milk. The conductivity of the milk may be used as an indication of unwanted contamination in the milk. Alternative sensors used for the same purpose may include optical sensors, electromagnetic sensors or sensors for measuring the electric impedance of the milk.

According to one embodiment, said sensor comprises a sensor configured to sense the turbidity of the milk. An optical sensor or electromagnetical sensor may be used to sense the turbidity of the milk.

According to one embodiment, the sensor comprises at least one of a sensor configured to sense the electric conductivity of the milk and a sensor configured to sense the turbidity of the milk, and the sensor is arranged in the milk transport conduit upstream the controllable valve arrangement. Thereby, milk of unacceptable condition may be redirected to the second tank before reaching the first tank.

According to one embodiment, the control device is configured to control the controllable valve arrangement so as to redirect the milk flow to the second tank upon receiving information from sensors arranged in the milk transport conduit, and to redirect the milk flow before the milk of unacceptable condition reaches the controllable valve arrangement. Thus milk of unacceptable quality can be prevented from contaminating milk that is already present in the first tank, and can instead be gathered in the second tank and/or be discarded.

According to one embodiment, said sensor comprises a sensor configured to sense an operational parameter indicative of the functionality of a cooling system including a compressor and an evaporator via which heat is exchanged with the milk in first milk tank. The sensor may be any kind of suitable sensor for detecting a fault in the cooling system that results in a deviation of the actual cooling effect of the cooling system on the milk in the tank in relation to an expected effect. An example may be to monitor on and off time of the evaporator. Other examples of measurements, may include measurement of power consumed by an evaporator or of any other power-consuming component which is essential for the functionality of cooling system, the pressure of the refrigerant, which correlates with the evaporating temperature, may be measured and used as an indicator of cooling system functionality. The pressure may also be an early indicator of leakage in the system.

According to one embodiment, said sensor comprises a sensor configured to measure an operational parameter indicative of the functionality of a stirrer provided in the first tank. The sensor may be any kind of suitable sensor for the given purpose, for example a rotational speed meter, a sensor configured to measure power consumption by the stirrer, or plural thermometers in the milk tank and comparison of the indicated temperatures as an indication of the stirrer condition. If there is no stirring there is a temperature difference, which means the stirrer might not be working as assumed. If, for example, the rotational speed of the stirrer deviates a predetermined amount from an expected rotational speed, given the power delivered to the stirrer and the viscosity of the milk in the tank, which would indicate that the stirrer is unable of guaranteeing an even heat distribution in the milk, and the presence of hot spots and cold spots in the milk, the control device is configured to redirect the milk flow to the second milk tank. A 3D-accelerometer may be arranged on the stirrer for the purpose of measuring the actual stirring of the stirrer.

According to one embodiment, the milking system is characterized in that it comprises at least one sensor configured to sense a milk property of milk present in the second milk tank or flowing towards the second milk tank through said milk transport conduit, or a property of a second cooling arrangement for controlling the temperature of the milk in the second milk tank, and that the control device is connected to said at least one sensor and configured to control the controllable valve arrangement on basis of information from said sensor.

According to one embodiment, the second tank has a corresponding set of sensors as the first tank, and the control device is configured to redirect the flow of milk from the second to the first tank on the same conditions as it is configured to redirect the flow from the first tank to the second tank.

The object of the invention is also achieved by means of a method of controlling a milking system configured to milk animals, said system comprising:
  at least one milking station,
  a first milk tank and a second milk tank,
  a milk transport conduit extending from the milking station towards the first and second milk tank and having a first branch extending to the first tank and a second branch extending to the second tank,
  a controllable valve arrangement configured to open or close the first branch and to open or close the second branch (4b), to control to which of the first milk tank and the second milk tank that milk is transported through one of said first and second branch,
  a control device configured to control the controllable valve arrangement, and said method being characterized in that it comprises the steps of:
  sensing a milk property of milk present in the first milk tank or milk flowing towards the first milk tank through said milk transport conduit, and/or
  sensing a property of a cooling arrangement for controlling the temperature of the milk in the first milk tank, and
  controlling the controllable valve arrangement on basis of information from said sensor.

According to one embodiment, the milking system is a milking system according to the present invention as defined hereinabove, and the step of sensing the milk property or the property of the cooling arrangement is executed by said at least one sensor, and the step of controlling the controllable valve arrangement is executed by said control device, preferably in accordance with the teaching of any or any combination of the embodiments of the milking system disclosed hereinabove.

The invention also relates to a computer program product comprising computer program code for causing a computer to implement the method according to the present invention when the computer program is executed in the computer.

The invention also relates to a computer program product comprising a non-transitory data storage medium which can be read by a computer and on which the program code of a computer program according to the present invention is stored.

The present invention also relates to an electronic control device of a milking system comprising an execution means and a data storage medium which is connected to the execution means and on which the computer program code of a computer program according to the present invention is stored.

Further features and advantages of the present invention are presented in the following detailed description of embodiments.

BRIEF DESCRIPTION OF THE DRAWING

Embodiments of the invention will be described in detail with reference to the drawing, on which FIG. 1 is a schematic representation of a milking system according to the invention.

DETAILED DESCRIPTION OF EMBODIMENTS

FIG. 1 shows an embodiment of a milking system configured to milk animals, preferably cows. The milking system comprises a plurality of milking stations 1, a first milk tank 2 and a second milk tank 3, a milk transport conduit 4 extending from the milking station towards the first and second milk tank 2, 3 and having a first branch 4a extending to the first tank 2 and a second branch 4b extending to the second tank 3.

The milking system further comprises a controllable valve arrangement 5 configured to open or close the first branch 4a and to open or close the second branch 4b, to control to which of the first milk tank 2 and the second milk tank 3 that milk is transported through one of said first and second branch 4a, 4b.

The milking system further comprises an electronic control device 6 configured to control the controllable valve arrangement 5.

There is provided a plurality of sensors 7, 8, 9, 10, 11 configured to sense a milk property of milk present in the first milk tank 2 or flowing towards the first milk tank 2 through said milk transport conduit 4, and configured to sense a property of a cooling arrangement 12 for controlling the temperature of the milk in the first milk tank 2. The control device 6 is connected to the sensors 7, 8, 9, 10, 11 and configured to control the controllable valve arrangement 5 on basis of information from the sensors 7, 8, 9, 10, 11. The control device 6 is configured to close the first branch 4a and open the second branch 4b as a response to information from said sensors 7, 8, 9, 10, 11 indicating a deviation of the sensed property from a predetermined range.

The sensors 7, 8, 9, 10, 11 comprise a first sensor 7 configured to measure the temperature of the milk in the first milk tank 2, a second sensor 8 configured to measure the electric conductivity or electric impedance in the milk, a third sensor configured to measure the turbidity of the milk, preferably an optical sensor. In the embodiment shown, the second sensor 8 and the third sensor 9 are arranged in the milk transport conduit 4 upstream the controllable valve arrangement 5. As an alternative the second and third sensors 8, 9 could be arranged in the first tank 2.

There is also provided a fourth sensor 10 configured to measure the temperature of a coolant in a cooling system 13 which is part of the cooling arrangement 12. The cooling system 13 comprises a condenser 14, an expansion valve 15 and evaporator 16 and a compressor 17. The condenser 14 cools and condenses the coolant into saturated liquid which travels through the expansion 15 valve, which reduces the pressure and the temperature of the coolant. The coolant then passes the evaporator 16, where the coolant exchanges heat with the first tank 2. Thereafter, the coolant reaches the compressor 17, in which it is compressed (and heated), before returning to the condenser 14. The measurement of the temperature of the coolant at the evaporator 16 gives an indication of the condition and functionality of the cooling system 13. Other measurements resulting in a corresponding indication is a matter of design for the person skilled in the art. For example, the pressure of the refrigerant, which correlates with the evaporating temperature, may be measured and used as an indicator of cooling system functionality. The pressure may also be an early indicator of leakage in the system. Alternatively, or as a supplement, the power consumption of the evaporator may be measured and used as an indicator of the evaporator condition.

A fifth sensor 11 is provided, which is configured to measure an operational parameter indicative of the functionality of a stirrer 18 provided in the first tank 2. In the embodiment shown, the fifth sensor 11 is configured to measure the rotational speed of the stirrer 18. The fifth sensor 11 may comprise a 3D-accelerometer provided on the stirrer, and/or a sensor for measuring the power consumption of the stirrer 18, or any other sensor suitable for the purpose of checking the functionality of the stirrer.

The milking system further comprises at least one sensor 8, 9, 19, 20, 21 configured to sense a milk property of milk present in the second milk tank 3 or flowing towards the second milk tank 2 through said milk transport conduit 4, or a property of a second cooling arrangement 22 for controlling the temperature of the milk in the second milk tank 3, and that the control device 6 is connected to said at least one sensor 8, 9, 19, 20, 21 and configured to control the controllable valve arrangement 5 on basis of information from said sensor 8, 9, 19, 20, 21. The control device 6 is configured to close the second branch 4b and open the first branch 4a as a response to information from said sensors 8, 9, 19, 20, 21 indicating a deviation of the sensed property from a predetermined range. The sensors 8, 9, 19, 20, 21 associated to the second tank 3 correspond to the sensors 7, 8, 9, 10, 11 associated to the first tank.

During operation of the milking system, when milk is directed from the milking stations 1 towards and into the first milk tank 2, the invention thus comprises the steps of:

sensing a milk property of milk present in the first milk tank 2 and milk flowing towards the first milk tank 2 through said milk transport conduit 4, and sensing a property of the cooling arrangement 12 which is configured to control the temperature of the milk in the first milk tank 2, and controlling the controllable valve arrangement 5 on basis of information from the sensors 7, 8, 9, 10, 11 associated to first tank.

As a response to information from said sensors 7, 8, 9, 10, 11 indicating a deviation of the sensed property from a predetermined range. The control device 6 is configured to close the first branch 4a and open the second branch 4b, thereby redirecting the flow of milk towards the second milk tank 3.

During operation of the milking system, when milk is directed from the milking stations 1 towards and into the second milk tank 3, the invention thus comprises the steps of:

sensing a milk property of milk present in the second milk tank 3 and milk flowing towards the second milk tank 3 through said milk transport conduit 4, and sensing a property of the cooling arrangement 12 which configured to control the temperature of the milk in the second milk tank 3, and controlling the controllable valve arrangement 5 on basis of information from the sensors 8, 9, 19, 20, 21 associated to the second tank 3.

As a response to information from said sensors 8, 9, 19, 20, 21 associated to the second tank 3 indicating a deviation of the sensed property from a predetermined range. The control device 6 is configured to close the second branch 4b and open the first branch 4a, thereby redirecting the flow of milk towards the first milk tank 2.

The control device comprises a computer program product comprising computer program code for causing a computer to implement a method according the invention when the computer program is executed in the computer. There is provide a computer program product comprising a non-transitory data storage medium which can be read by a computer and on which the program code of the computer program is stored. The electronic control device 6 thus comprises an execution means and a data storage medium which is connected to the execution means and on which the computer program code of a computer program according to the invention is stored.

The invention claimed is:

1. A milking system configured to milk animals, said system comprising:
   at least one milking station;
   a first milk tank;
   a first cooling arrangement configured to cool the temperature of the milk in the first milk tank;
   a second milk tank;
   a milk transport conduit extending from the at least one milking station towards the first and second milk tanks and having a first branch extending to the first tank and a second branch extending to the second tank;

a controllable valve arrangement configured to open or close the first branch and to open or close the second branch to control to which of the first milk tank and the second milk tank a milk flow is transported through one of said first and second branches;

a controller configured to control the controllable valve arrangement; and at least one sensor located within the first milk tank or the first cooling arrangement and configured to sense a milk property of milk present in the first milk tank, or configured to sense a property of the first cooling arrangement, said at least one sensor being connected to the controller, the controller being configured to control the controllable valve arrangement in response to information from said at least one sensor to redirect the milk flow, ending the transport of the milk via the first branch to the first milk tank and redirecting the transport of the milk via second branch to the second milk tank, by the controller being configured to close the first branch and open the second branch as a response to the information from said at least one sensor indicating a deviation of the sensed property from a predetermined range.

2. The milking system according to claim 1, wherein said at least one sensor comprises a sensor that is located within the first milk tank and that senses a property that is indicative of the temperature of the milk in the first milk tank, the controller being configured to control the controllable valve arrangement in response to information of the temperature of the milk in the first milk tank obtained from said sensor to redirect the milk flow, ending the transport of the milk via the first branch to the first milk tank and redirecting the transport of the milk via the second branch to the second milk tank, by the controller being configured to close the first branch and open the second branch.

3. The milking system according to claim 2, further comprising:

at least one additional sensor located within the first cooling arrangement and configured to sense a property of the first cooling arrangement configured to control the temperature of the milk in the first milk tank, the controller being connected to said at least one additional sensor and configured to control the controllable valve arrangement in response to information from said at least one additional sensor.

4. The milking system according to claim 2, further comprising:

at least one additional sensor located within the first milk tank and configured to sense a property of the first cooling arrangement configured to control the temperature of the milk in the first milk tank, the controller being connected to said at least one additional sensor and configured to control the controllable valve arrangement in response to information from said at least one additional sensor.

5. The milking system according to claim 1, wherein said at least one sensor comprises a temperature sensor.

6. The milking system according to claim 1, wherein said at least one sensor comprises a sensor configured to sense the electric conductivity of the milk.

7. The milking system according to claim 6, further comprising at least one further sensor which comprises at least one of an electric conductivity sensor configured to sense the electric conductivity of the milk and a milk turbidity sensor configured to sense the turbidity of the milk, the at least one further sensor being disposed in the milk transport conduit upstream the controllable valve arrangement.

8. The milking system according to claim 7, wherein the controller is configured to control the controllable valve arrangement to redirect the milk flow to the second tank upon receiving information from the at least one further sensor disposed in the milk transport conduit, and to redirect the milk flow before milk of unacceptable condition reaches the controllable valve arrangement.

9. The milking system according to claim 1, wherein said at least one sensor comprises a sensor configured to sense the turbidity of the milk.

10. The milking system according to claim 1, wherein said at least one sensor is located within the first milk tank or the first cooling arrangement and comprises a sensor configured to sense an operational parameter indicative of the functionality of the first cooling arrangement, and wherein the controller is configured to control the controllable valve arrangement to redirect the milk flow, wherein upon receiving information from the at least one sensor concerning the functionality of the first cooling arrangement, the controller closes the first branch and opens the second branch to end the transport of the milk via the first branch to the first milk tank and redirect the transport of the milk via the second branch to the second milk tank.

11. The milking system according to claim 1, wherein said at least one sensor comprises a sensor configured to measure an operational parameter indicative of a functionality of a stirrer provided in the first tank.

12. The milking system according to claim 1, further comprising:

a second cooling arrangement configured to cool the temperature of the milk in the second milk tank;

at least one additional sensor located within the second milk tank or the second cooling arrangement and configured to sense a milk property of milk present in the second milk tank, or a property of the second cooling arrangement, the controller being connected to said at least one additional sensor and configured to control the controllable valve arrangement in response to information from said at least one additional sensor to redirect the milk flow from the second milk tank to the first milk tank, by ending the transport of the milk via the second branch to the second milk tank and redirecting the transport of the milk via the first branch to the first milk tank by the controller being configured to close the second branch and open the first branch as a response to the information from said at least one sensor indicating a deviation of the sensed property from a predetermined range.

13. The milking system according to claim 1, wherein the first cooling arrangement includes an evaporator, a compressor, and a heat exchanger via which heat is exchanged with the milk in first milk tank, and said at least one sensor is located within the first milk tank and comprises a sensor configured to sense an operational parameter of said evaporator indicative of the functionality of the first cooling arrangement.

14. The milking system according to claim 1, wherein said at least one sensor is located within the first cooling arrangement and comprises a sensor configured to sense an operational parameter indicative of the functionality of the first cooling arrangement including an evaporator, a compressor, and a heat exchanger via which heat is exchanged with the milk in first milk tank.

15. A method of controlling a milking system configured to milk animals, said milking system including at least one milking station, a first milk tank, a second milk tank, a milk transport conduit extending from the at least one milking station towards the first and second milk tanks and having a first branch extending to the first tank and a second branch extending to the second tank, a controllable valve arrangement configured to open or close the first branch and to open or close the second branch to control to which of the first milk tank and the second milk tank milk is transported through one of said first and second branch, a controller device configured to control the controllable valve arrangement, and at least one sensor located within the first milk tank or a cooling arrangement configured to cool the temperature of the milk in the first milk tank, said method comprising:

sensing one or more of: (i) a milk property of milk present in the first milk tank, and (ii) a property of the cooling arrangement configured to cool the temperature of the milk in the first milk tank; and controlling the controllable valve arrangement in response to information from said at least one sensor.

16. The method according to claim 15, wherein the sensing the milk property or the property of the cooling arrangement is executed by said at least one sensor, and the controlling the controllable valve arrangement is executed by said controller.

17. A computer program product embodied on a non-transitory data storage medium, the computer program product comprising computer program code to cause a computer to implement the method according to claim 15 when the computer program is executed in the computer.

18. A non-transitory data storage medium which can be read by a computer and on which the computer program code of the computer program product according to claim 17 is stored.

19. An electronic control device of a milking system, the electronic control device comprising:

at least one processor; and a data storage medium which is connected to the at least one processor and on which the computer program code of the computer program product according to claim 14 is stored.

20. A milking system configured to milk animals, said system comprising:

at least one milking station;

a first milk tank;

a second milk tank;

a milk transport conduit extending from the at least one milking station towards the first and second milk tanks and having a first branch extending to the first tank and a second branch extending to the second tank;

a controllable valve arrangement configured to open or close the first branch and to open or close the second branch to control to which of the first milk tank and the second milk tank a milk flow is transported through one of said first and second branches;

a controller configured to control the controllable valve arrangement; and at least one sensor located within the first milk tank and configured to sense a milk property of milk present in the first milk tank, said at least one sensor comprising a sensor that senses a property that is indicative of the temperature of the milk in the first milk tank, and said at least one sensor being connected to the controller, the controller being configured to control the controllable valve arrangement in response to information from said at least one sensor to redirect the milk flow, ending the transport of the milk via the first branch to the first milk tank and redirecting the transport of the milk via the second branch to the second tank, by the controller being configured to close the first branch and open the second branch as a response to the information from said at least one sensor indicating a deviation of the sensed property from a predetermined range.

* * * * *